United States Patent [19]

Bodin

[11] Patent Number: 5,633,048
[45] Date of Patent: May 27, 1997

[54] HAND HELD DISPENSER FOR LAYING A STRIP OF FLEXIBLE MATERIAL UNDER A SEAL, LAYING METHOD THEREFOR, AND USES OF SAID STRIP

[76] Inventor: Pierre Bodin, 76 route de Strabourg, Illkirch Graffenstaden, France, 67400

[21] Appl. No.: 295,799

[22] PCT Filed: Mar. 16, 1993

[86] PCT No.: PCT/FR93/00259

§ 371 Date: Jan. 3, 1995

§ 102(e) Date: Jan. 3, 1995

[87] PCT Pub. No.: WO93/18862

PCT Pub. Date: Sep. 30, 1993

[30] Foreign Application Priority Data

Mar. 17, 1992 [FR] France ................... 92 03337

[51] Int. Cl.[6] .................................................. B05D 3/00
[52] U.S. Cl. ................ 427/444; 427/282; 427/163.1; 118/504; 118/301
[58] Field of Search ...................... 118/504, 301; 427/140, 444, 282, 163.1; 52/204.597, 208, 393; 296/84.1, 93, 96.12, 96.21, 146.15; 29/458, 460, 527.2, 527.4

[56] References Cited

U.S. PATENT DOCUMENTS

| | | | |
|---|---|---|---|
| 4,385,015 | 5/1983 | Klettke | 427/140 |
| 4,933,032 | 6/1990 | Kunert | 52/204.597 |
| 4,964,362 | 10/1990 | Dominguez | 118/315 |
| 4,996,092 | 2/1991 | Francis et al. | |

FOREIGN PATENT DOCUMENTS

| | | |
|---|---|---|
| 0424114 | 4/1991 | European Pat. Off. . |
| 440982 | 9/1985 | Sweden . |

*Primary Examiner*—Laura Edwards
*Attorney, Agent, or Firm*—Davis and Bujold

[57] ABSTRACT

A hand-held dispenser consisting of a dispensing tip to which a strip is fed from a container or a paying-out reel. A strip of flexible material may be laid under one lip of a linear or peripheral seal, and the lip may be held in a raised position when treating or spraying paint onto the area adjacent to and covered by the seal. The dispenser is particularly suitable for use by coachbuilders and vehicle repair shops.

18 Claims, 8 Drawing Sheets

HAND HELD DISPENSER FOR LAYING A STRIP OF FLEXIBLE MATERIAL UNDER A SEAL, LAYING METHOD THEREFOR, AND USES OF SAID STRIP

FIELD OF THE INVENTION

The invention relates to a method and to a hand dispenser for placing a strip of flexible material intended to hold linear or perimeter seals, in particular lip seals, for example the leak tight seals of vehicle windows, in the raised state before painting or treatment.

BACKGROUND OF THE INVENTION

When a vehicle goes into a paint shop, for example for repainting of the body of a vehicle or a part thereof after repairs to the panelling following an accident, or for the purpose of touching up or decorating the vehicle, the work proves particularly difficult to perform at the borders between the bodywork to be painted and the neighbouring unpainted parts.

Thus, the glazed surfaces must be protected. They are usually covered with a paper screen, held by an adhesive tape fixed onto the seal along the perimeter of each window and of the windscreen.

The seal, generally made from rubber or from a semi-rigid plastic material, provides the leaktightness and simultaneously masks by covering the joining perimeter border between the edges of the windscreen and the bodywork. For this purpose, it covers the bodywork over a few millimetres.

In order to avoid an abrupt and unsightly discontinuity of the paint film at the edge of the lip of this seal, which promotes the start of flaking in the new coat of paint, it is necessary to raise the lip of the seal and to hold it raised during the spraying and drying of the paint.

It is thus possible to ensure continuity of the coat of paint under the covering lip of the seal.

In this manner, when the paint is sprayed, the spray also reaches the zone normally covered by the seal in a continuous manner.

In the final state, the seal therefore covers the border of the coat of paint, giving an aesthetic appearance of continuity and protecting this border against atmospheric corrosion.

In order to raise the lip of the seal and to hold it in the raised state over the entire perimeter of a windscreen or of a window, coachbuilders currently have available only makeshift means.

These are for example a linear insertion in the form of a flexible tubular pipe which is interposed between the lip of the seal and the bodywork by sliding it manually along the latter.

This tubular pipe may also be fitted using a guide which is introduced under the seal in order to raise it, and which is then slid along this seal all around the window. The tubular pipe slides in this guide in order to be laid down in the space existing between the seal and the bodywork.

This technique proves however to be unsatisfactory, because it has numerous drawbacks.

This tubular pipe manufactured for fluid linkages is available on the market only in certain sizes, for example five metres. Furthermore, its diameter proves to be ill-suited to the various types and widths of seals in existence.

Thus, when it is used for a small window, the remaining length must be gathered, wound, protected and fixed at the centre of the window while the painting stage is gone through, which requires additional handling operations.

Furthermore, it is necessary to have one piece of pipe for each window perimeter.

During the entire length of the painting and drying phase, it remains unavailable for a second coachbuilder.

As regards the actual use, these tubular pipes cannot provide a complete solution to all the difficulties of placing and of holding the lip of the seal in the raised state. It is particularly difficult to position the pipe so as to raise the lip of the seal evenly. In fact, the pipe squashes slightly then slides under the seal and wedges in an unordered manner because, in particular, of the play and of the variable surface condition of the gap existing between the windscreen and the bodywork. An irregularity of the border of the coat of paint therefore results.

In addition, the pipe tends to slide to the bottom of the groove between the seal and the bodywork, which leads to a raising of the lip of the seal which is still more irregular or unsatisfactory.

On the other hand, the pipe has a pronounced tendency to flatten or squash under mechanical stress, because of its tubular shape and a certain elasticity of the material from which it is made.

In addition, when this pipe is removed after the painting stage, it often remains glued by the paint. By the tearing force, small ridges therefore form, which, even when situated under the seal, may in the long term lead to the start of flaking of the new coat of paint.

Because of the expensive and impractical nature of this pipe, professionals often use a single electrical cable with its insulation, which is easily found on the market with different diameters suitable for various types of seals. However, this cable also becomes randomly placed under the seal, leading to irregular and variable raising of the latter. Furthermore, it is inconvenient to introduce under the seal. Finally, the coachbuilder must have a large number of different cables continuously in reserve.

OBJECT OF THE INVENTION

The aim of the invention is to overcome these drawbacks by replacing the pipe or the electrical cable hitherto used by a strip of disposable flexible foam delivered in a great length or bought by the metre.

Thus, the length may be adapted exactly to that of the seal. The strip is laid down evenly under the lip of the seal. It stays without sliding at the position where it is placed, the foam compensating for the play between the seal and the bodywork. According to the varying degree to which the strip of foam is stretched during placement, with the foam also being compressed to a greater or lesser extent by the return force of the seal against the bodywork, it is possible to raise the lip of this seal in the desired manner.

The final fitting of the foam is performed with the aid of the finger. The invention furthermore makes it possible to fold, at the end of the lip, the adhesive tape protecting the seal from the paint and forming the junction with the edge of the flat material protecting the window. Retraction of this adhesive tape during passage through the drier is thus avoided.

SUMMARY OF THE INVENTION

Since the strip of foam remains in place at the position where it is laid down and immobilised, it becomes unnecessary to push it to the bottom of the groove in order to block it in position, as in the prior solutions. It is thus possible to place it where desired, that is to say at the optimum position.

The strip of foam is particularly easy and quick to place and lay down.

Furthermore, it is possible to choose a foam which has the property of absorbing the paint. Thus, instead of an abrupt break in the coat of paint, with a sharp edge which is a cause of subsequent flaking, a progressive and even reduction in the thickness of the coat of paint under the seal will be obtained.

The method according to the invention proves particularly useful and efficient for the narrower seals framing windows and windscreens and which are firmly attached by gluing and which currently exist in large numbers, and for which conventional cables or flexible pipes are particularly difficult to fit.

In fact, the seal, in the case of glued windows, is a leaktight and aesthetic seal in general consisting of a semi-rigid moulding forcibly introduced into the gap existing between the window and the edge of the bodywork. This moulding is fragile and sometimes solidly attached to the bodywork by the excess of glue used for gluing the windscreen.

It proves preferable not to remove it during the painting stage.

Also, because of the bowed shape of the lip covering the bodywork, the conventional flexible tubular pipe or the cable slides and becomes immobilised at the bottom of the groove without sufficiently raising the seal.

The use of the flexible strip of foam according to the invention is therefore, in this case also, particularly efficient and advantageous.

Another aim of the invention is to provide a dispensing instrument for placing the strip, which further facilitates its fitting.

For this purpose, the instrument according to the invention is equipped with a dispensing nozzle making it possible to raise the covering lip of the seal, and to deliver and insert the strip evenly under this lip so as to hold it in a temporarily raised position. It comprises an inlet or a reserve of strip delivered from a cartridge, from a container or from a reel roll. It is also equipped with a gripping means which may be an element which is added on, or even the container itself.

BRIEF DESCRIPTION OF THE DRAWINGS

The technical characteristics and other advantages of the invention are given in the following description which is made by way of non-limiting example of one embodiment with reference to the accompanying drawings in which like reference characters designate like or corresponding parts throughout the several views, and wherein:

FIGS. 3 to 6 are views illustrating the fitting of the strip, of which:

DETAILED DESCRIPTION OF THE INVENTION

The invention proceeds from the general inventive idea according to which a strip of flexible foam is inserted under the perimeter seal of a windscreen, of a window or other wall closing an opening, between this seal and the adjacent surface to be painted or to be treated, in order to effectively and evenly raise the lip or one of the lips over part or all of its length, and to keep it held in the raised state resulting from the presence of the strip for a specified length of time corresponding to the operations of painting or treating of the bodywork and of subsequent drying.

A strip 1 of flexible material, for example a foam of the polyethylene type, is used with a cross-section matched in shape and size to that of a perimeter seal 2 perimetering a windscreen 3 or a window to be protected during the operations of painting or treating a vehicle bodywork 4, or a part of the latter situated in proximity to the seal. A lip 5 of this seal 2 covers the bodywork over the perimeter of the windscreen or of the window 3.

The term flexible material is to be understood to mean any material capable, after having been stretched, compressed or pressed, of then returning to its initial state or to a sufficiently close state, allowing its use according to the invention, or one which undergoes expansion after placement.

An example of a flexible material which can be used for producing the strip is described in U.S. Pat. No. 4,996,092.

The term strip is to be understood to mean any elongate continuous physical shape similar to a cord or to a wire, whatever the particular characteristics of their cross-sectional shape.

Preferably, but not necessarily, the strip will be without any sharp edges, having for example a cross-section of circular or oval shape.

One starting end 6 of the strip 1 is introduced at any point 7 under the seal 2, whose lip is locally raised, then the strip is continuously and progressively inserted under this lip over the entire perimeter until it returns to the starting point.

Obviously, it is also possible, as required, to raise the seal only over part of its length.

This starting end 6 may be formed in a specific manner in the strip. For example, it will comprise a possibly rigid tip or a suitable configuration facilitating its introduction and its immobilisation under the lip of the seal, either manually or by using a suitable instrument.

After fitting, the strip is cut to the sufficient length and the painting or treatment operations are carried out.

According to a variant representing a basic manual implementation of the method, the seal may initially be raised, for example using a screwdriver or any other tool with a thin end. One end of the strip is introduced and is held with one hand in proximity to the bottom of the groove under the lip of the seal, while with the other hand, the strip is inserted bit by bit under the seal along the perimeter, tensioning it so as to obtain the desired raising of the seal and while pushing it in with the finger.

However, rapid and efficient systematic implementation of the method according to the invention will preferably be performed using a dispensing instrument, for example the one referenced 8 in FIG. 2, of which several variants will be described further on with reference to FIGS. 12 to 18.

This dispensing instrument 8 has the following general characteristics and functions.

It consists first of a dispensing nozzle 9 used for moving the lip 5 of the seal 2 away from the vehicle bodywork 4 and bringing the strip 1 under this lip, and through which nozzle the strip passes, leaving it after compression by the internal shape of the nozzle 9 which converges towards the exit.

It next comprises an entry or reserve of strip, this possibly being enclosed in a container in which a given length of strip may be coiled, for example ten or fifteen metres, or in a stationary, mobile, removable or refillable magazine, for example in the form of a holder of the reel type, around which the strip is wound.

Also, it comprises a gripping means by which it may be grasped by the user for manipulating the instrument, and this gripping means may be the container or the magazine, or an element or a member which is added on, for example a handle.

Means for advancing or pushing the reserve strip and means for bringing it towards the entry end of the nozzle are also furthermore provided by way of an accessory or optionally.

Advantageously, preference will be given to a dispensing nozzle of the general internal and external shape which converges from its entry end 10 towards its free exit end 11, which is for example conical, so as to be able to introduce it easily under the lip 5 of the seal, to raise the latter and to slide the end of the nozzle delivering the strip easily between the said lip and the bodywork panelling.

This dispensing nozzle may be made in the form of a hollow tip or a sleeve of cylindrical, conical or cylindro-conical shape, or any other converging shape.

It will be made from a material which cannot scratch the bodywork, for example a rigid plastic material. As required, the rigidity of the nozzle will be obtained and/or reinforced by longitudinal ribs or fluting.

If a nozzle with a converging tip is chosen such that the exit cross-section of the internal channel is of diameter less than that of the cross-section of R the uncompressed strip of foam, as represented in the figures, the additional advantage of compressing the foam before its fitting under the lip of the seal will be obtained.

Because of its elastic properties, the foam will expand under the seal just after leaving the dispensing nozzle, this effect being increased by the tension imparted to the strip when it is fitted.

Obviously, other embodiments of the tip constituting the nozzle 9 are possible.

Furthermore, the nozzle may be removably fixed onto the dispenser body 8, for example by threading, so that the user can have available a set of interchangeable dispensing nozzles, which are different from each other because they can be used as a function of the diameter of the strip and of the shape of the seal.

In order to fit the strip under the covering lip of a seal using a dispensing instrument 8 according to the invention, the following simple procedure is adopted.

At any point of the seal lining the perimeter of the windscreen or of the window, the end of the dispensing nozzle 9, from which a short length of the strip extends, is introduced by slightly raising the lip. It is then inserted under the seal between the bodywork panelling and the covering lip.

The end of the strip is held back simply by pressing with a finger, and the nozzle 9 of the instrument, which is preferably held obliquely with respect to the general local direction of the seal as seen in FIGS. 3 to 6, is simply slid along the seal. The strip unwinds, sliding through the nozzle, and is laid down continuously without sliding to the bottom of the groove under the covering lip of the seal after the end of the nozzle has raised it.

By varying the tension in the strip, a greater or lesser compression of the strip is obtained, which will facilitate introduction.

As required, a second pass following the first will be made.

Once the lip has been raised over its entire surround perimeter, the strip is simply cut.

The seals of all the windows of a vehicle may thus be raised rapidly.

The dispensing instrument 8 used for fitting becomes available again immediately for the preparation of a second vehicle or for another work station.

Figure 7:
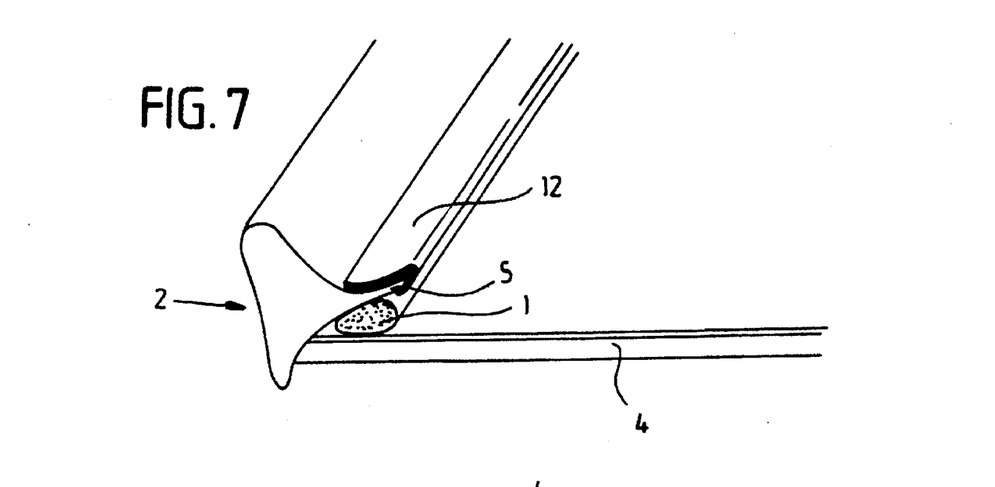
FIGS. 7, 8 and 9 are perspective views of the seal, with the strip in place, respectively before, during and after the paint spraying.
Figure 8:
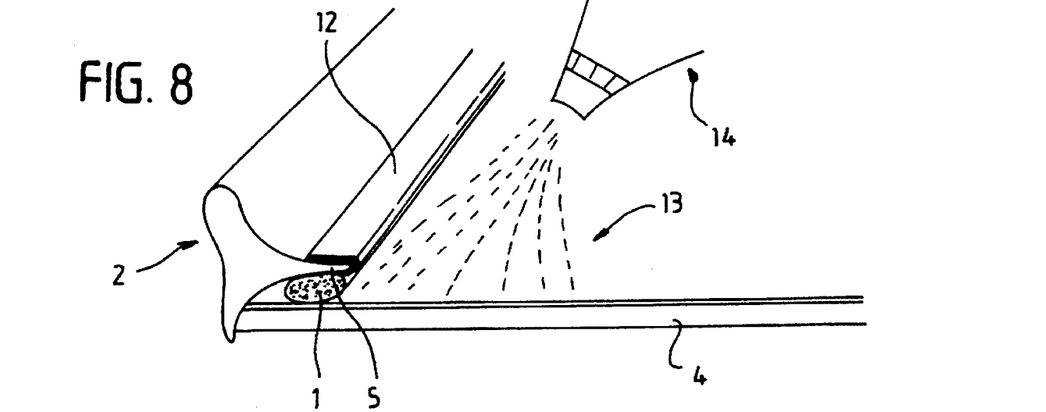

After the strip has been fitted under the seal of a window, the seal is protected from paint sprays by an adhesive tape 12, which may also hold the screen for protecting the window by folding it around the end edge of the covering lip of the seal as seen in FIGS. 7 to 8.

The treatment or the painting of the bodywork is then carried out by spraying paint 13, for example using a gun, only the end 14 of which is represented.

Figure 9:
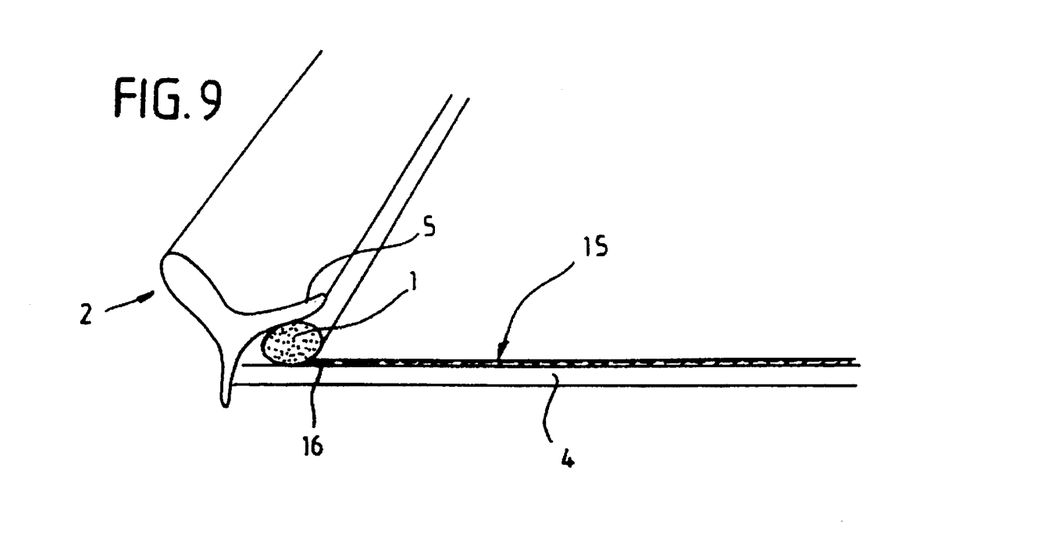

The strip of foam makes it possible to produce an excellent quality finishing of the coat of paint 15, in particular at the end border 16 under the seal.

After drying, the strip is removed by pulling on one end of the latter so as to free it from the seal, the latter immediately resuming its initial position. The lip returns due to the effect of its elasticity to cover the newly painted bodywork surface under the seal.

The junction is clean, the seal not having been stained with paint. The end border of the coat of paint is progressive, avoiding any risk of subsequent flaking.

The method remains effective even for very thin seals.

Figure 10:
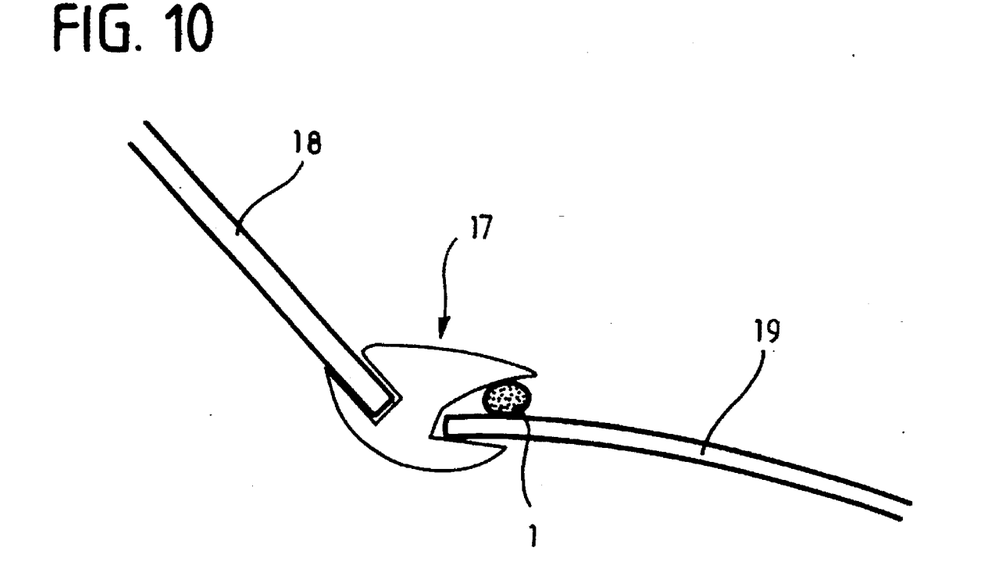
FIG. 10 is a cross-sectional view of a perimeter seal of the conventional type after fitting of the strip.
Figure 11:
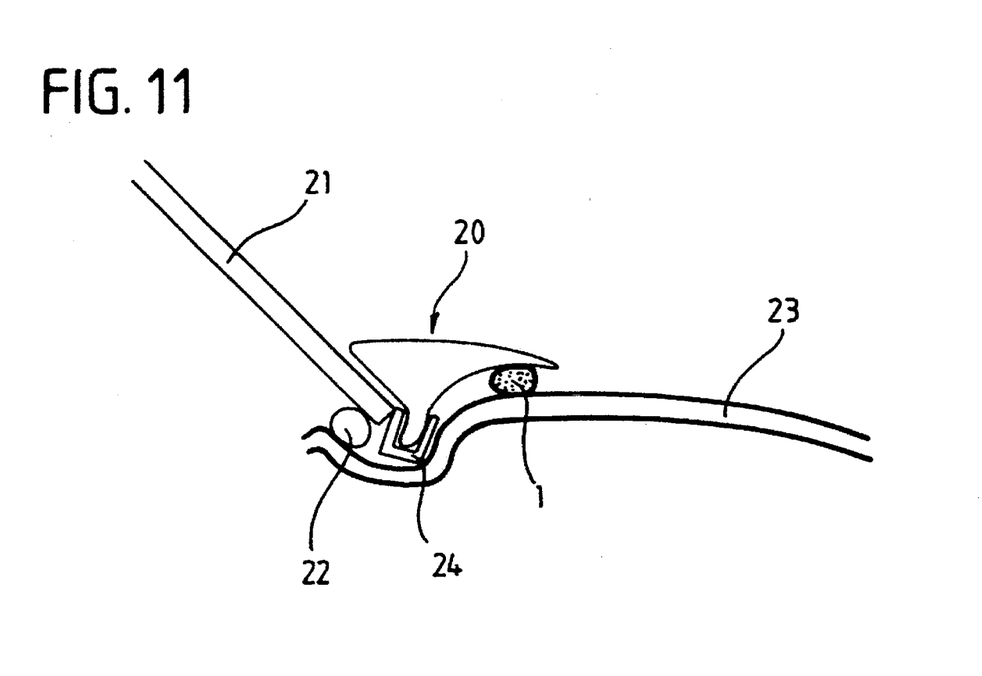
FIG. 11 is a similar sectional view in the case of a perimeter seal for a window which is attached by gluing.

The method and the dispensing and fitting instrument are particularly well suited to various types of seals in existence, two examples of which are represented non-limitingly in FIGS. 10 and 11, in the case of vehicles.

The seal may be, for example, a seal 17 for holding a window or conventional windscreen 18 on a body 19, as represented in FIG. 10 with the seal raised, or a seal 20 for a window or a windscreen 21 solidly attached by a strip of glue 22 onto a body 23, as represented in FIG. 11. In this example, the seal is inserted into an intermediate holding element 24 of the moulding type.

Various examples of instruments suited to fitting the flexible strip of foam are represented in FIGS. 12 to 18.

Figure 12:
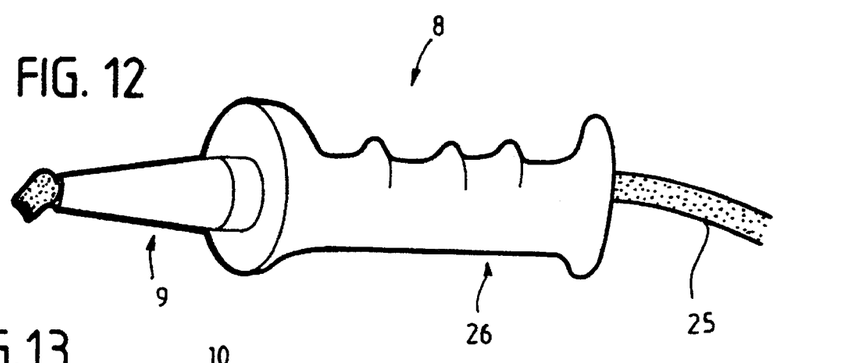
FIGS. 12 and 13 are profile and sectional views of the dispensing instrument according to its basic variant.
Figure 13:
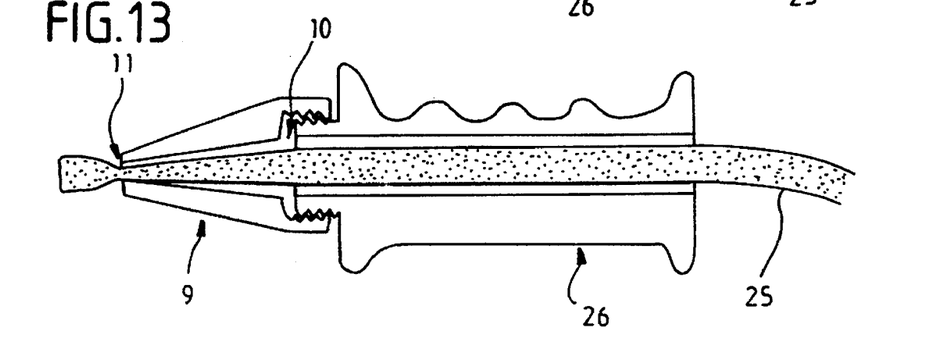

According to a simple embodiment of the instrument 8, which is given as a basic variant in FIGS. 12 and 13, the reserve of strip consists of a free length of strip 25 which the user will himself cut to the desired size, and of which he will introduce one end into the instrument through the dispensing nozzle 9.

According to this variant, the strip will be packaged for example in a box or a carton containing a substantial length, for example fifty metres of strip in the form of a roll to be unwound as it is used. The strip will be cut either by hand or by using a cutting edge with which the packaging may be fitted, or by a cutting instrument, blade, knife, or scissors.

Possibly, the strip will be admitted directly and continuously into the dispensing instrument.

The gripping means is, in this variant, in the form of an ergonomic handle 26, at the end of which the dispensing nozzle 9 is fixed. The handle is hollow, so that the strip can pass through it. The arrangement of the handle concentric with the axis of the nozzle is useful for manipulation of the instrument during the fitting. If required, the handle may however be arranged transversely.

Figures 14, 15:
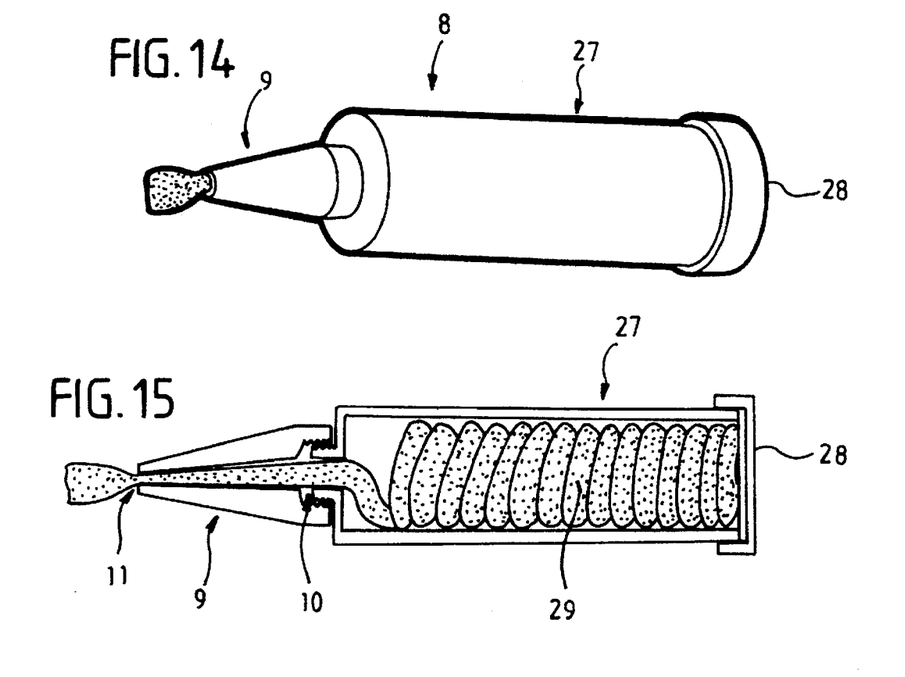
FIGS. 14 and 15 are mixed profile and sectional views of the instrument according to a variant with a reserve of the strip.

In the case of the variant represented in FIG. 14 and 15, the reserve of strip is enclosed in a container 27 in the form of a flexible or rigid cardboard, plastic, metal or other cylinder, equipped for example with a removable end 28, in which a given length 29 of strip is enclosed, for example twenty, thirty or forty metres. The strip may be introduced "loose" but it will preferably be introduced in an orderly manner, for example coiled, that is to say wound on itself, the foam being compressed or uncompressed, in the form of a ball or a spool whose geometrical axis coincides with that of the container, and from which it will be unwound as it is used.

Obviously, other embodiments of the container used for the reserve of strip are possible, as a function of the shape and the size which it is desired to give to the dispenser body, and of the quantity of reserve strip necessary.

The container will be either refillable, by introducing a new length of strip or a new ball or spool, or replaceable. The reserve of strip may consist of a particular packaging of the strip, for example a flexible or heat-shrinkable covering or an easily replaceable cartridge.

Figure 1:
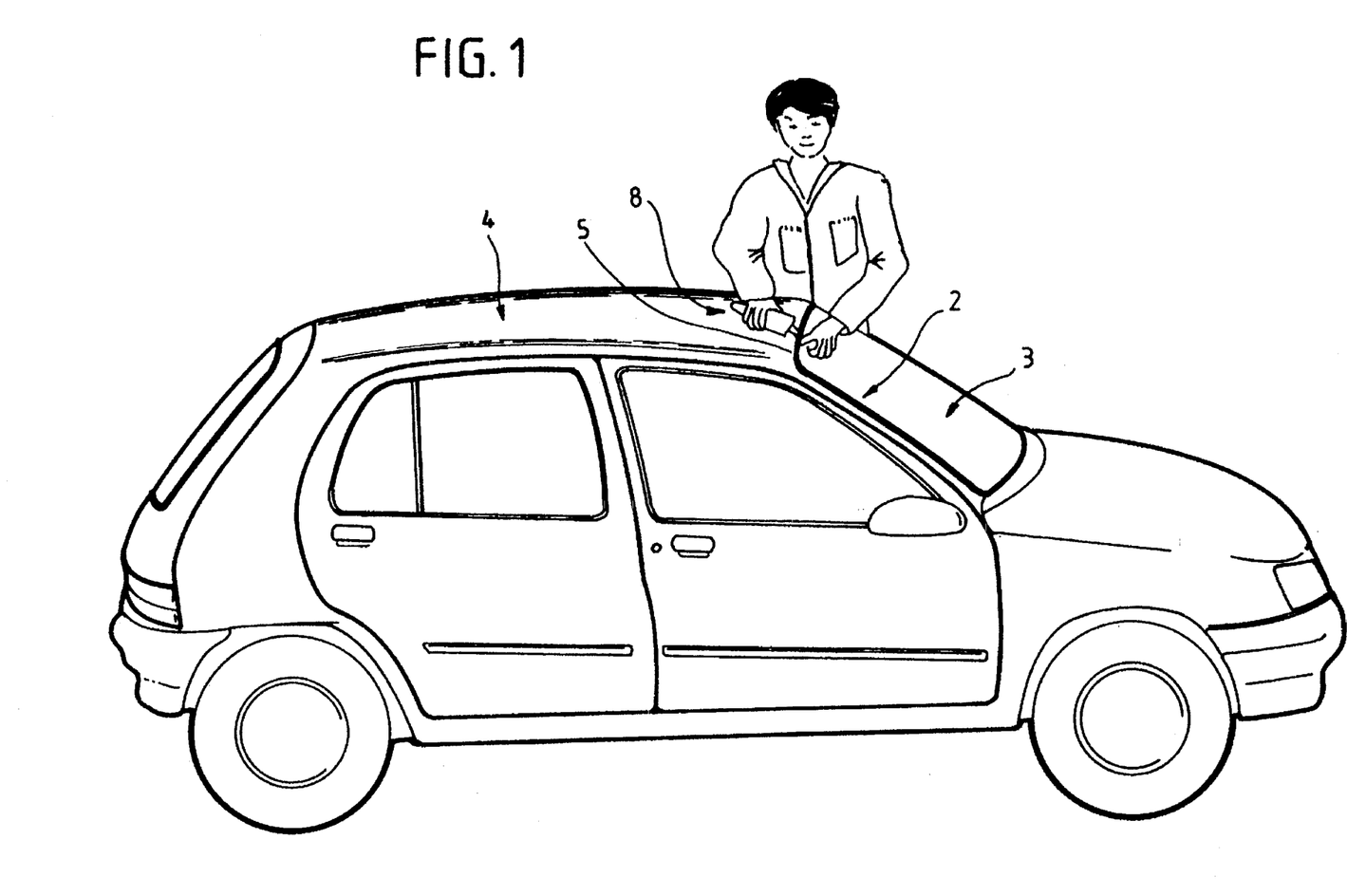
FIGS. 1 and 2 are general perspective views illustrating the method of fitting the strip for raising a car windscreen seal, using the dispensing instrument according to the invention.
Figure 2:
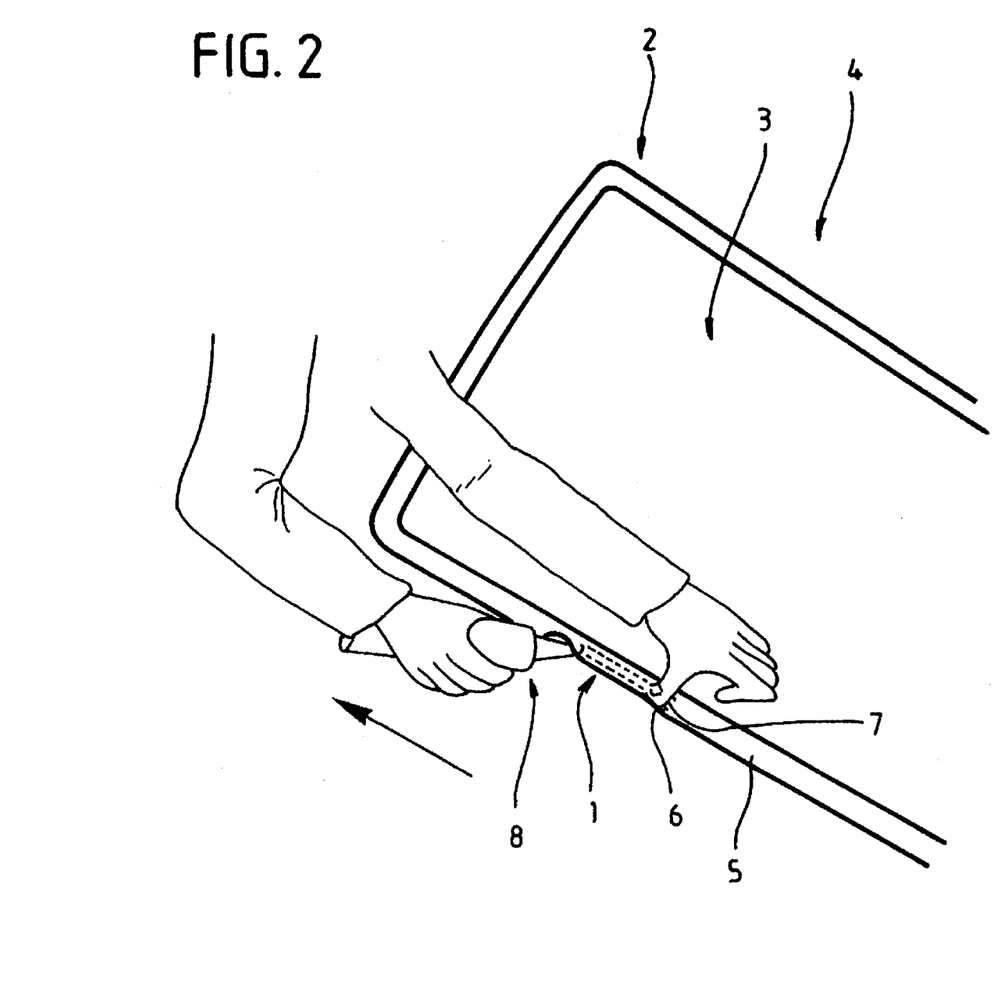
Figure 3:
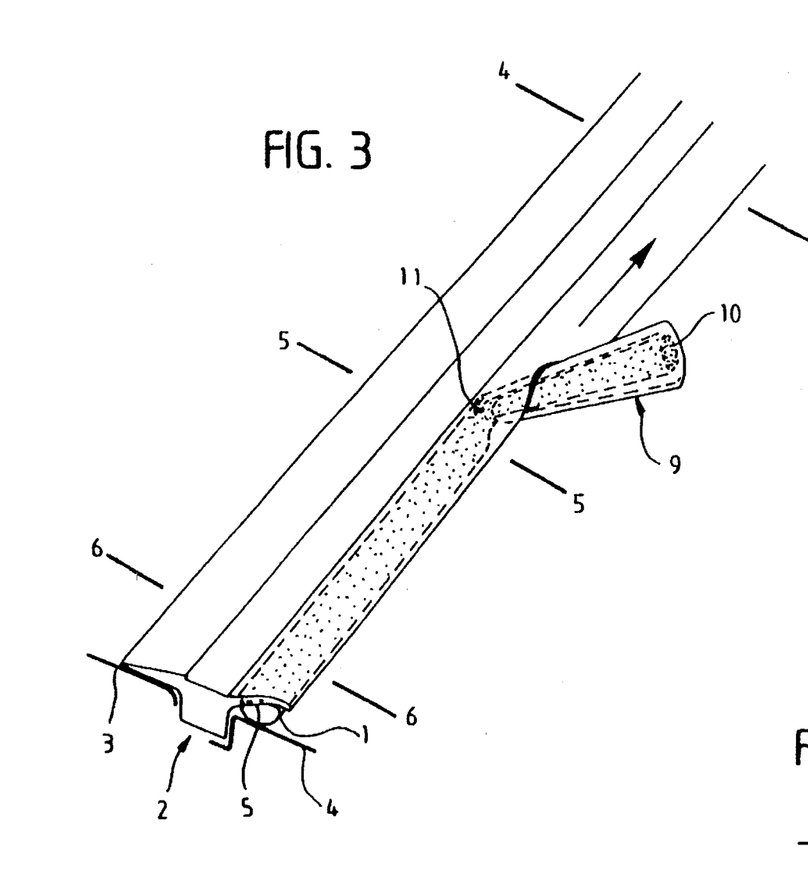
FIG. 3 is a perspective view of the seal under a length of whose Up the strip is already in place.
Figure 4:
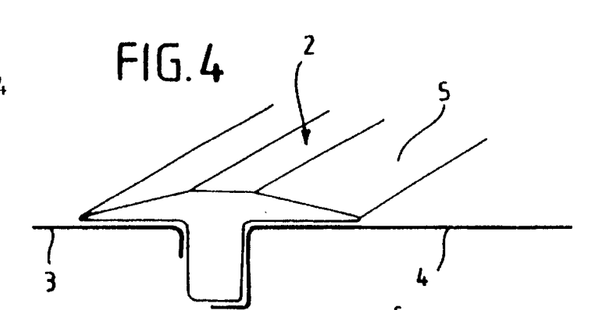
FIGS. 4, 5 and 6 are mixed sectional and perspective views at the cut lines respectively 4—4, and 5—5, and 6—6 in FIG. 3.
Figure 5:
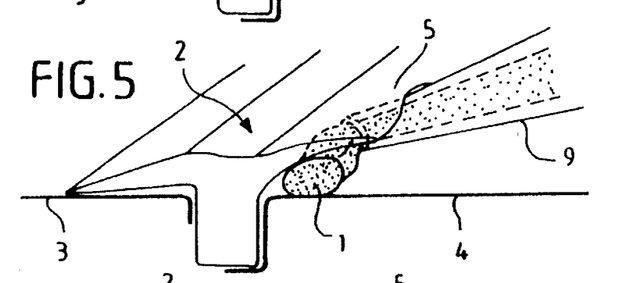
Figure 6:
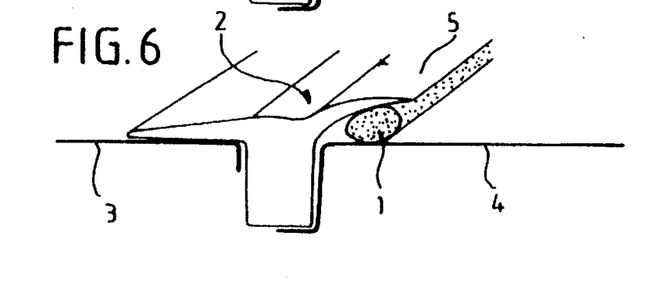

The container in which the reserve of strip is housed may be grasped directly by the hand of the user, as in the embodiment represented in FIGS. 14 and 15, whose use is illustrated in FIGS. 1 and 2. The gripping means is then the container itself. It will however be possible to arrange a lateral or longitudinal, fixed or removable ergonomically adapted handle.

Figure 16:
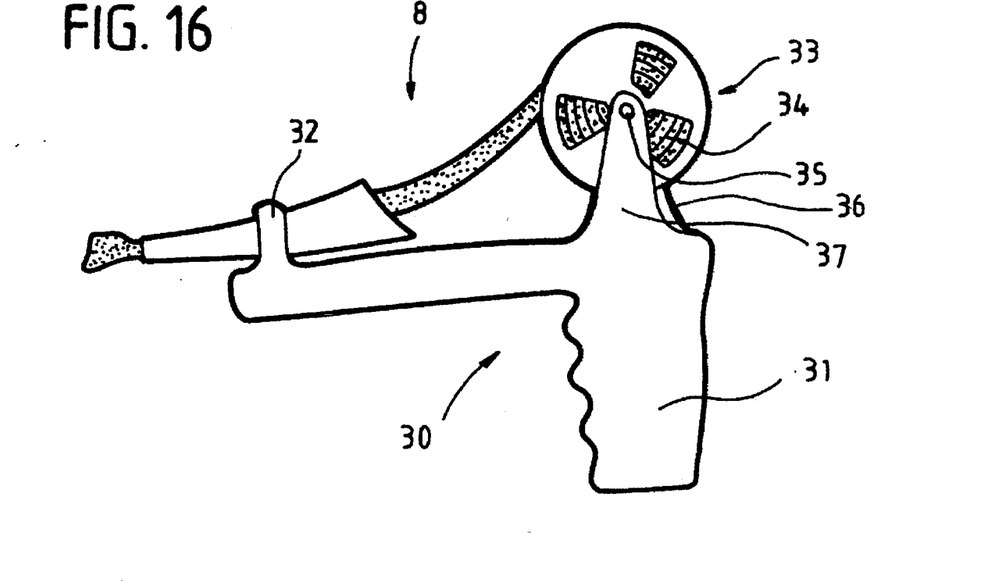
FIGS. 16 and 17 are profile views of the instrument according to variant embodiments with a roll reserve.
Figure 17:
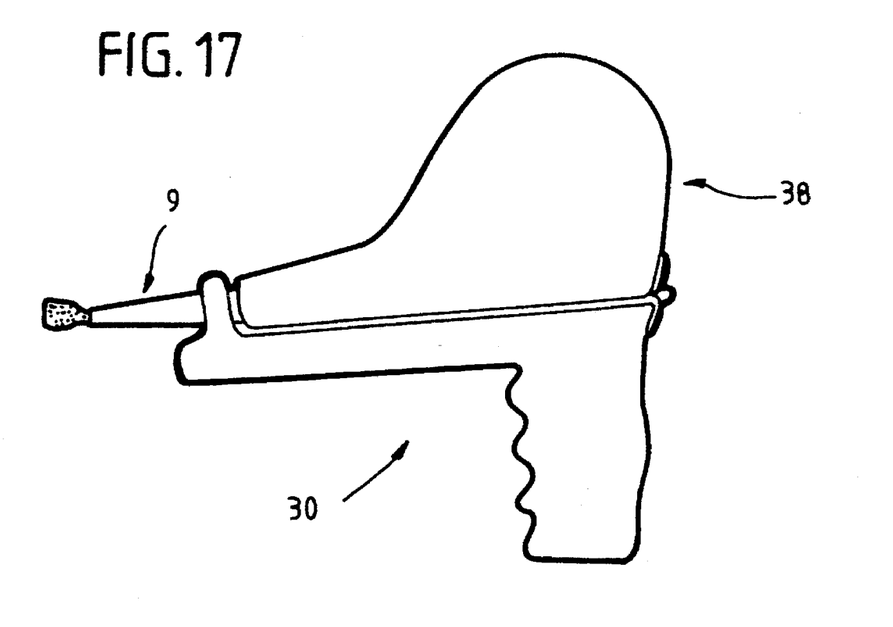

FIGS. 16 and 17 represent other embodiments of the dispensing instrument 8 according to the invention. The body of the dispenser adopts the general shape of a pistol 30 with a grip 31 used as a gripping member.

The dispensing nozzle 9 is removably mounted on the front end of the dispenser, for example in a holding loop 32 integrated formed with the body of the dispenser.

The reserve of strip here comes from an interchangeable spool or roll forming a reel 33, on which length 34 of strip is wound, and which is placed transversely to the body of the dispenser so as to unwind the strip directly and freely towards, and then through, the nozzle.

For example, the roll or the spool will be wound directly on a transverse rod forming a spindle 35 which can be mounted by snap or clip fitting on two vertical lateral branches 36, 37 of the body of the dispenser. Possibly, the strip may be directly wound onto this spindle.

On the other hand, as represented in FIG. 17, the instrument may also possibly be equipped with a protective casing 38.

The dispensing instrument according to these variants, but also possibly according to other variants, may furthermore comprise an advancing mechanism linked to a control, for example with a trigger, or other means, operated by the finger of the user in order to produce the pushing or the pulling of the strip into or out of the nozzle 9.

Figures 18, 19:
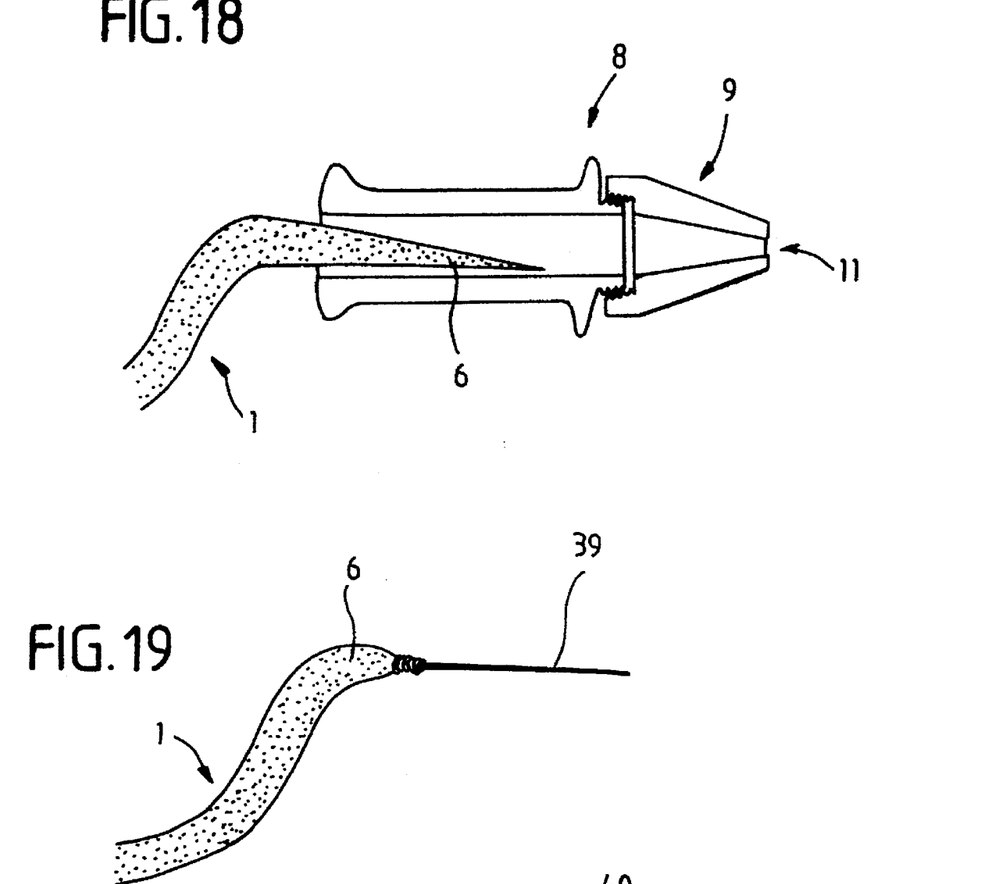
FIG. 18 is a sectional view of a hand dispenser, into whose body the end of a strip of foam is introduced.
FIGS. 19 and 20 are views of two different starting ends of the strip of foam to be inserted into the nozzle of the dispenser.
Figure 20:
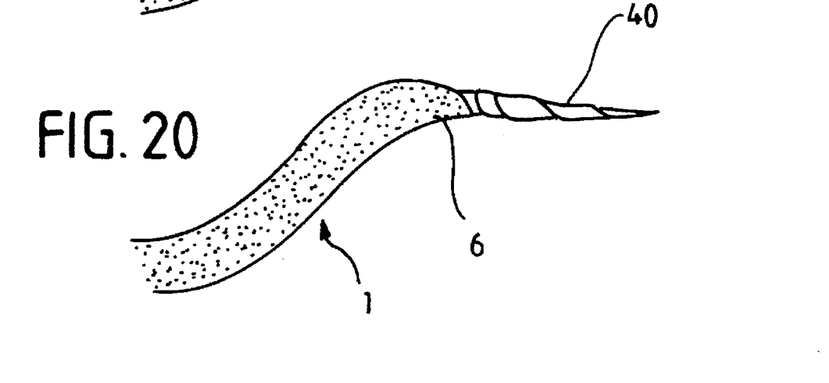

The problem posed by the initial introduction of the strip through the nozzle of the instrument may be solved in the following manner according to the embodiments of FIGS. 18 to 20.

In the case of a refill in the form of a reserve roll cartridge or spool, the starting end 6 will have a cross-section which decreases progressively so as to pass through the exit of the dispensing nozzle without compression. Possibly, this end may be fitted with an added-on tip 39, for example a wire or a thin and flexible and rigid rod clamping and compressing the starting end of the strip.

In the case of a free reserve of strip or in the event that the strip has been broken, the user will easily produce a thinned end either by bevelling the starting end of the strip, for example using blades with which the retail packaging container is fitted, or by shaping or treating the end, for example by winding a short length of adhesive tape 40 onto itself, or by any other means making it possible to obtain a pointed end of the strip passing through the dispensing nozzle.

It is obvious that beyond the means described, various obvious modifications and simple variants of the method as well as of the dispensing instrument fall within the scope of the present invention. It is therefore to be understood that within the scope of the appended claims, the present invention may be practiced otherwise than as specifically described herein.

I claim:

1. A method for inserting a strip of compressible material, having a non-compressed predetermined cross-sectional diametrical extent, beneath a perimeter seal member, interposed between two components and having a lip portion for engaging one of said two components, so as to permit a region of one of said two components, normally disposed beneath said seal member lip portion, to be spray painted in order to facilitate the continuity of the spray paint coating spray painted upon said one of said two components, comprising the steps of:

raising said lip portion of said seal member away from said one of said two components which is normally engaged by said lip portion of said seal member so as to define a space between said lip portion of said seal member and said one of said two components normally engaged by said lip portion of said seal member;

pre-compressing a leading end portion of said strip of compressible material by a dispensing means, such that the diametrical extent of said compressed leading end portion of said strip of compressible material is less than said non-compressed cross-sectional diametrical extent, prior to insertion of said leading end portion of said strip of compressible material into said space defined between said raised lip portion of said seal member and said one of said two components normally engaged by said lip portion of said seal member so as to facilitate insertion of said strip of compressible material into said space defined between said raised lip portion of said seal member and said one of said two components normally engaged by said lip portion of said seal member; and inserting said compressed leading end portion of said strip of compressible material into said space defined between said raised lip portion of said seal member and said one of said two components normally engaged by said lip portion of said seal member and permitting said compressed leading end portion of said strip of compressible material to expand toward said non-compressed cross-sectional diametrical extent so as to maintain said lip portion of said seal member in said raised state with respect to said one of said two components with which said lip portion of said seal member is normally engaged and thereby facilitate subsequent spray painting of a region of said one of said two components normally disposed beneath said lip portion of said seal member.

2. The method as set forth in claim 1, further comprising the steps of:

immobilizing said leading end portion of said strip of compressible material once said leading end portion of said strip of compressible material has been inserted into said space defined between said raised lip portion of said seal member and said one of said two components normally engaged by said lip portion of said seal member; and moving said dispensing means along said raised lip portion of said seal member and within said space defined between said raised lip portion of said seal member and said one of said two components normally engaged by said lip portion of said seal member so as to further extract additional amounts of said strip of compressible material from said dispensing means.

3. The method as set forth in claim 2, further comprising the steps of:

spray painting a region of said one of said two components normally engaged by said lip portion of said seal member, while said lip portion of said seal member is maintained in said raised state, which is within the vicinity of a portion of said one of said two components which is normally engaged by said lip portion of said seal member; and removing said strip of compressible material from said space defined between said lip portion of said seal member and said one of said two components normally engaged by said lip portion of said seal member so as to permit said lip portion of said seal member to again engage said one of said two components normally engaged by said lip portion of said seal member and thereby cover said spray-painted region of said one of said two components normally engaged by said lip portion of said seal member.

4. The method as set forth in claim 1, wherein:
said compressible material comprises a compressible foam.

5. The method as set forth in claim 4, wherein:
said compressible foam comprises polyethylene.

6. The method as set forth in claim 1, wherein:
said compressible material comprises a compressible absorbent foam.

7. The method as set forth in claim 1, wherein:
said one of said two components comprises an automotive body panel; and
a second one of said two components comprises an automotive window.

8. A hand-held dispenser for inserting a strip of compressible material, having a non-compressed predetermined cross-sectional diametrical extent, beneath a perimeter seal member interposed between two components and having a lip portion for normally engaging one of said two components, comprising:

nozzle means having a dispensing end for insertion into a space defined between said lip portion of said seal member and said one of said two components normally engaged by said lip portion of said seal member when said lip portion of said seal member has been raised away from said one of said two components normally engaged by said lip portion of said seal member, and for maintaining said lip portion of said seal member in a raised state with respect to said one of said two components normally engaged by said lip portion of said seal member;

means defined upon said dispensing end of said nozzle means for pre-compressing a leading end portion of said strip of compressible material, such that the cross-sectional diametrical extent of said compressed leading end portion of said strip of compressible material is less than said non-compressed cross-sectional diametrical extent of said compressible material, prior to dispensing of said leading end portion of said compressible material out from said dispensing end of said nozzle means and into said space defined between said raised lip portion of said seal member and said one of said two components normally engaged by said lip portion of said seal member so as to facilitate insertion of said strip of compressible material into said space defined between said raised lip portion of said seal member and said one of said two components normally engaged by said lip portion of said seal member and subsequent expansion of said compressed leading end portion of said strip of compressible material back toward said non-compressed cross-sectional diametrical extent so as to maintain said lip portion of said seal member in said raised state with respect to said one of said two components which is normally engaged by said lip portion of said seal member; and handle means operatively connected to said nozzle means for moving said nozzle means of said dispenser along said raised lip portion of said seal member and within said space defined between said raised lip portion of said seal member and said one of said two components normally engaged by said lip portion of said seal member so as to further dispense additional amounts of said strip of compressible material from said nozzle means of said dispenser.

9. The dispenser as set forth in claim 8, wherein:
said means for pre-compressing said leading end portion of said strip of compressible material comprises a convergent channel defined within said nozzle means, operatively connected to said dispensing end of said nozzle means, and having a cross-sectional diametrical extent at said dispensing end of said nozzle means which is less than said non-compressed cross-sectional diametrical extent of said compressible material.

10. The dispenser as set forth in claim 8, wherein:
said handle means has first threaded means defined thereon; and
said nozzle means has second threaded means defined thereon for threaded engagement with said first threaded means of said handle means for threadedly mounting said nozzle means upon said handle means.

11. The dispenser as set forth in claim 8, wherein:
said handle means has a passageway defined therethrough through which a supply of said compressible material is able to be conducted toward said nozzle means.

12. The dispenser as set forth in claim 11, wherein:
said handle means has a longitudinal axis; and said passageway extends axially through said handle means.

13. The dispenser as set forth in claim 8, wherein:

said handle means comprises a substantially cylindrical container within which a supply of said compressible material is stored for dispensing through said nozzle means.

14. The dispenser as set forth in claim 8, wherein:

said handle means comprises a pistol having a barrel portion and a handle grip portion;

said nozzle means is operatively mounted upon a leading end of said barrel portion; and a supply spool of said compressible material is rotatably mounted atop said handle grip portion.

15. The dispenser as set forth in claim 14, further comprising:

a protective casing mounted upon said handle means for covering said supply spool of said compressible material.

16. The dispenser as set forth in claim 8, wherein:

said compressible material comprises a compressible foam.

17. The dispenser as set forth in claim 16, wherein:

said foam comprises polyethylene.

18. The dispenser as set forth in claim 8, wherein:

said handle means has threaded means defined thereon for threadedly mounting said nozzle means thereon whereby any one of a plurality of different nozzle means, having different dispensing ends for dispensing different compressible materials having different cross-sectional diametrical extents, may be threadedly mounted upon said handle means.

* * * * *